US012697987B2

(12) United States Patent
Creswell

(10) Patent No.: US 12,697,987 B2
(45) Date of Patent: Aug. 4, 2026

(54) SELECTION-INFERENCE NEURAL NETWORK SYSTEMS

(71) Applicant: GMD Holding LLC, Mountain View, CA (US)

(72) Inventor: Antonia Phoebe Nina Creswell, London (GB)

(73) Assignee: GDM Holding LLC, Mountain View, CA (US)

( * ) Notice: Subject to any disclaimer, the term of this patent is extended or adjusted under 35 U.S.C. 154(b) by 211 days.

(21) Appl. No.: 18/317,878

(22) Filed: May 15, 2023

(65) Prior Publication Data

US 2023/0365146 A1 Nov. 16, 2023

Related U.S. Application Data

(60) Provisional application No. 63/342,006, filed on May 13, 2022.

(30) Foreign Application Priority Data

May 19, 2022 (EP) ..................................... 22174372

(51) Int. Cl.
| | |
|---|---|
| *G06F 40/20* | (2020.01) |
| *B60W 50/02* | (2012.01) |
| *B60W 50/06* | (2006.01) |
| *B60W 60/00* | (2020.01) |
| *G05B 13/02* | (2006.01) |
| *G06N 5/04* | (2023.01) |
| *G06N 5/046* | (2023.01) |

(52) U.S. Cl.
CPC ........ *B60W 50/06* (2013.01); *B60W 50/0205* (2013.01); *B60W 60/001* (2020.02); *G05B*

13/027 (2013.01); *G06F 40/20* (2020.01); *B60W 2420/403* (2013.01); *B60W 2420/408* (2024.01)

(58) Field of Classification Search
CPC ............... B60W 50/06; B60W 60/001; B60W 50/0205; B60W 2420/408; B60W 2420/403; B60W 30/12; B60W 30/16; B60W 30/162; B60W 30/165; B60W 30/17; G06F 40/20; G05B 13/027; B60K 28/00–165; G05D 1/0088; G05D 1/021; G05D 1/0214; G05D 1/0221; G05D 1/0223; G05D 1/0061; G06N 5/04; G06N 5/046
USPC ........................................... 701/27, 23, 29.1
See application file for complete search history.

(56) References Cited

U.S. PATENT DOCUMENTS

| | | | | |
|---|---|---|---|---|
| 10,482,181 B1 * | 11/2019 | Rubin | ...................... | G06N 5/02 |
| 10,943,185 B1 * | 3/2021 | Witting | ................... | G06F 9/451 |
| 11,354,509 B2 * | 6/2022 | Hermann | ............. | G06N 3/0895 |

(Continued)

FOREIGN PATENT DOCUMENTS

JP 2021111334 A 8/2021

OTHER PUBLICATIONS

Soumya Jain et al., Context-Aware Deep Learning Approach for Answering Questions, Dec. 2021, IEEE, pp. 26-31.*

(Continued)

*Primary Examiner* — Manglesh M Patel
(74) *Attorney, Agent, or Firm* — Fish & Richardson P.C.

(57) ABSTRACT

Methods, systems, and apparatus, including computer programs encoded on a computer storage medium, for generating a response to a query input using a selection-inference neural network.

26 Claims, 5 Drawing Sheets

(56) References Cited

U.S. PATENT DOCUMENTS

| | | | | |
|---|---|---|---|---|
| 11,663,224 | B2* | 5/2023 | Zhang | G06F 16/24578 707/723 |
| 11,768,869 | B2* | 9/2023 | Lipka | G06F 16/58 707/769 |
| 11,842,277 | B2* | 12/2023 | Fang | G06N 3/006 |
| 11,847,575 | B2* | 12/2023 | Ferrucci | G06N 5/025 |
| 12,265,526 | B2* | 4/2025 | Saxe | H04L 63/20 |
| 12,271,407 | B2* | 4/2025 | Hill | G06F 40/30 |
| 12,450,464 | B2* | 10/2025 | Irving | G06F 40/35 |
| 2013/0346354 | A1* | 12/2013 | Mizell | G06N 5/025 706/47 |
| 2018/0052842 | A1* | 2/2018 | Hewavitharana | G06F 16/24522 |
| 2020/0202194 | A1 | 6/2020 | Wu et al. | |
| 2020/0216089 | A1* | 7/2020 | Garcia | G06F 16/90332 |
| 2020/0242146 | A1* | 7/2020 | Kalukin | G06F 16/3329 |
| 2020/0242199 | A1* | 7/2020 | Ploennigs | G06N 20/00 |
| 2020/0311540 | A1* | 10/2020 | Chakraborty | G06N 3/08 |
| 2020/0320139 | A1* | 10/2020 | Duishoev | G06F 16/90335 |
| 2021/0019642 | A1* | 1/2021 | O'Malia | G06N 5/04 |
| 2021/0125030 | A1* | 4/2021 | Lazaro-Gredilla | G06N 3/08 |
| 2023/0042004 | A1* | 2/2023 | Kumar | G06F 18/24133 |
| 2024/0070204 | A1* | 2/2024 | Prakash | G06N 5/04 |
| 2024/0112038 | A1* | 4/2024 | Dasgupta | G06F 16/90332 |
| 2024/0160626 | A1* | 5/2024 | Crabtree | G06F 16/9024 |
| 2024/0185083 | A1* | 6/2024 | Hansen | G06N 3/045 |
| 2024/0189994 | A1* | 6/2024 | P G | B25J 9/161 |
| 2025/0021548 | A1* | 1/2025 | Petersen | G06F 16/24522 |
| 2025/0093828 | A1* | 3/2025 | Ahuja | G06N 3/09 |
| 2025/0384666 | A1* | 12/2025 | Akula | G06V 10/764 |

OTHER PUBLICATIONS

Yuangang Yao et al., Query Processing based on Associated Semantic Context Inference, 2015, International Conference on Information Science and Control Engineering, pp. 395-399.*
Jyun-Yu Jiang et al., RIN: Reformulation Inference Network for Context-Aware Query Suggestion, 2018, ACM, pp. 197-206.*
Baosong Yang et al., Context-Aware Self-Attention Networks, 2019, aaai.org, pp. 387-394.*
Creswell Antonia, Selection-Inference: Exploiting Large Language Models For Interpretable Logical Reasoning, 2023 ICLR, pp. 1-36.*
International Preliminary Report on Patentability in International Appln. No. PCT/EP2023/062781, dated Nov. 7, 2024, 8 pages.
Andreas et al., "Neural module networks," Proceedings of the IEEE Conference on Computer Vision and Pattern Recognition (CVPR), 2016, pp. 39-48.
Betz et al., "Critical thinking for language models," CoRR, Sep. 15, 2020, arXiv:2009.07185, 16 pages.
Cartuyvels et al., "Autoregressive Reasoning over Chains of facts with transformers," CoRR, Dec. 17, 2020, arXiv:2012.11321v1, 15 pages.
Clark et al., "Transformers as soft reasoners over language," CoRR, Feb. 14, 2020, arXiv:2002.05867, 15 pages.
Cobbe et al., "Training verifiers to solve math word problems," CoRR, Oct. 27, 2021, arXiv:2110.14168, 22 pages.
Dalvi et al., "Explaining answers with entailment trees," CoRR, Apr. 17, 2021, arxiv.org/abs/2104.08661, 13 pages.
Extended Search Report in European Appln. No. 22174372.7, dated Nov. 15, 2022, 9 pages.
Ghazal et al., "BigBench V2: The new and improved BigBench," 2017 IEEE 33rd International Conference on Data Engineering (ICDE), Apr. 19-22, 2017, pp. 1225-1236.
Hudson et al., "Learning by abstraction: The neural state machine," CoRR, Jul. 9, 2019, arXiv:1907.03950, 17 pages.
International Search Report and Written Opinion in International Appln. No. PCT/EP2023/062781, dated Jun. 7, 2023, 14 pages.
Jhamtani et al., "Learning to explain: Datasets and models for identifying valid reasoning chains in multihop question-answering," CoRR, Oct. 7, 2020, arXiv:2010.03274, 14 pages.
Lampinen et al., "Tell me why! Explanations support learning of relational and causal structure," CoRR, Dec. 7, 2021, arXiv:2112.03753, 23 pages.
Li et al., "A systematic investigation of commonsense understanding in large language models," Proceedings of the 2022 Conference on Empirical Methods in Natural Language Processing, Dec. 7-11, 2022, pp. 11838-11855.
Mao et al., "The neuro-symbolic concept learner: Inter-preting scenes, words, and sentences from natural supervision," CoRR, Apr. 26, 2019, arXiv:1904.12584, 28 pages.
Rae et al., "Scaling language models: Methods, analysis & insights from training gopher," CoRR, Dec. 8, 2021, arXiv:2112.11446, 120 pages.
Saha et al., "PRover: Proof generation for interpretable reasoning over rules," CoRR, Oct. 6, 2020, arXiv:2010.02830, 15 pages.
Tafjord et al., "Proofwriter: Generating implications, proofs, and abductive statements over natural language," CoRR, Dec. 24, 2020, arXiv:2012.13048, 14 pages.
Wei et al., "Chain of thought prompting elicits reasoning in large language models," Advances in Neural Information Processing Systems 35, 2022, 14 pages.
Welbl et al., "Constructing datasets for multi-bop reading comprehension across documents," Transactions of the Association for Computational Linguistics, May 1, 2018, 6:287-302.
Weston et al., "Towards ai-complete question answering: A set of prerequisite toy tasks," CoRR, Feb. 19, 2015, arXiv:1502.05698, 14 pages.
Yi et al., "Neural-symbolic vqa: Disentangling reasoning from vision and language understanding," CoRR, Oct. 4, 2018, arXiv:1810,02338, 19 pages.
Notice of Allowance in Japanese Appln. No. 2024-555988, mailed on Mar. 10, 2026, 5 pages (with English translation).
Office Action in Canadian Appln. No. 3,246,196, mailed on Feb. 5, 2026, 4 pages.
Notice of Acceptance in Australian Appln. No. 2023267975, mailed on Mar. 31, 2026, 3 pages.

* cited by examiner

Obtain context input
202

Receive query input
204

Process selection input to generate selection output
206

Process inference input to generate inference output
208

If not last update iteration, update the context input
210

If last update iteration, generate response
212

SELECTION-INFERENCE NEURAL NETWORK SYSTEMS

CROSS-REFERENCE TO RELATED APPLICATIONS

This application claims priority to U.S. Provisional Application No. 63/342,006, filed on May 13, 2022, and claims priority to EP 22174372.7, filed on May 19, 2022. The disclosures of the prior applications are considered part of and are incorporated by reference in the disclosure of this application.

BACKGROUND

This specification relates to generating a response to a query input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates a response to a query relating to an environment.

In particular, the system receives a context input that includes context information relating to the environment and a query input that includes a query relating to the environment.

The system then uses the context input to generate a response, e.g., a natural language response, to the query.

The system generates the response by repeatedly alternating between performing selection steps and inference steps. As a result, the system can generate trace data that provides natural language, interpretable information characterizing how the system arrived at the response.

Particular embodiments of the subject matter described in this specification can be implemented so as to realize one or more of the following advantages.

One problem with using a neural network-based approach to make control decisions for controlling, e.g., an agent or manufacturing plant is that it is often difficult to infer why a particular decision has been made—the neural network is a "black box" that is simply trusted to perform a task. Similarly, when diagnosing a fault in a mechanical system it can be useful to know the reasons behind the response.

Implementations of the described system can address this problem by providing a reasoning trace that may be displayed or otherwise provided to a user or stored for later review. This can be particularly useful when the control decisions or fault diagnosis relate to safe operation of a mechanical agent or manufacturing plant. Implementations of the described system can provide a reasoning trace in natural language that is human-interpretable, e.g., as a sequence of logical steps, presented as natural language statements, that lead from the query to the response in a causal chain.

More specifically, by generating the response by repeatedly alternating between two steps: 1) selection, which involves choosing a subset of relevant information sufficient to make a single step of inference; and 2) inference, which only sees the limited information provided to it by the selection output and uses it to infer a new intermediate piece of evidence on the way to producing the final answer, the described techniques ensures that intermediate inference outputs (and, optionally, selection outputs) provide an interpretable reasoning trace to justify the final answer. Moreover, the reasoning produced by the described techniques is causal, since each step follows from and depends on the previous step, and each inference is made in isolation based solely on the limited information provided by the selection output, without direct access to the query input or previous steps of reasoning. This results in a response that is high-quality while at the same time providing an interpretable, natural language "trace" of the reasoning performed by the system while generating the response.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates a response to a query relating to an environment using context information about the environment.

Figure 1A:
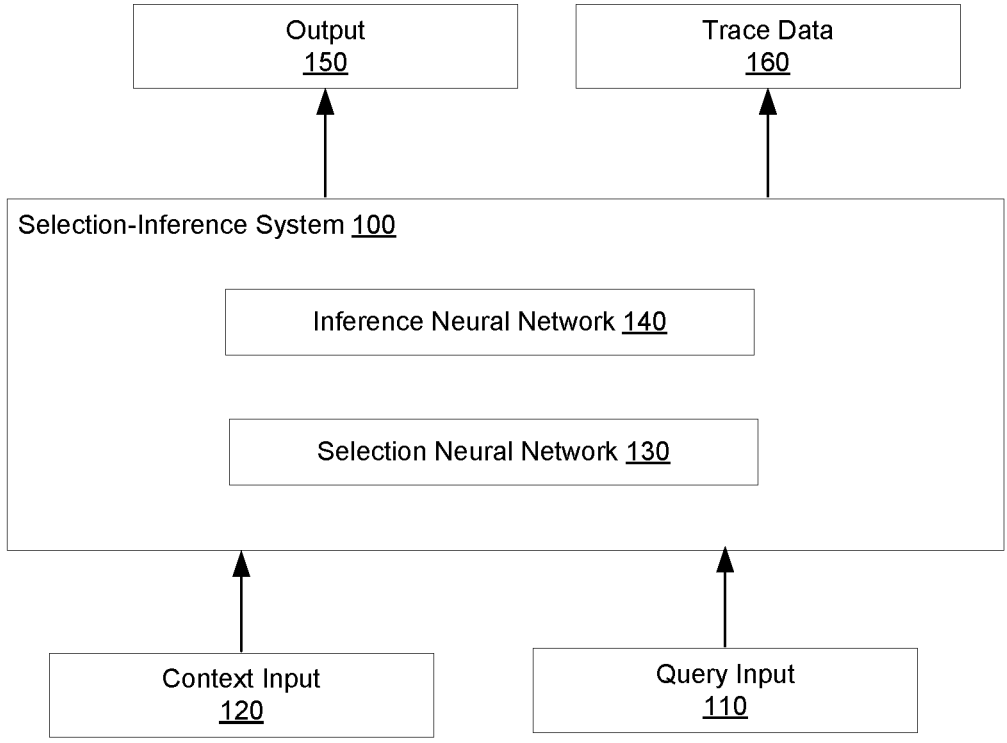
FIG. 1A shows an example selection-inference system.

FIG. 1A shows an example selection-inference system 100. The selection-inference system 100 is an example of a system implemented as computer programs on one or more computers in one or more locations, in which the systems, components, and techniques described below can be implemented.

The selection-inference system 100 can receive a query input 110 and a context input 120 and generate a response 150 to the query input 110 using the context input 120.

The query input 110 includes a query relating to an environment. For example, each query can be a text fragment in a natural language.

The context input 120 includes context information that provides context about the environment. More specifically, the context information in the context input 120 includes one or more natural language statements that each represent a rule or a fact relating to the environment.

In some implementations, the environment is a real-world environment and the system 100 facilitates reasoning in the real-world environment, e.g., to control a real-world system in the environment in a principled and logical manner. As described later, in some implementations, the system 100 can also provide trace data that includes a causal explanation of why a particular response 150 has been generated, which can facilitate trust in the system, in particular in environments in which safety is important.

For example, in some implementations, the environment is a real-world environment, and the response 150 is used for controlling a mechanical agent, such as a robot or autonomous or semi-autonomous vehicle, acting in the real world environment, to perform a task.

Figure 1B:
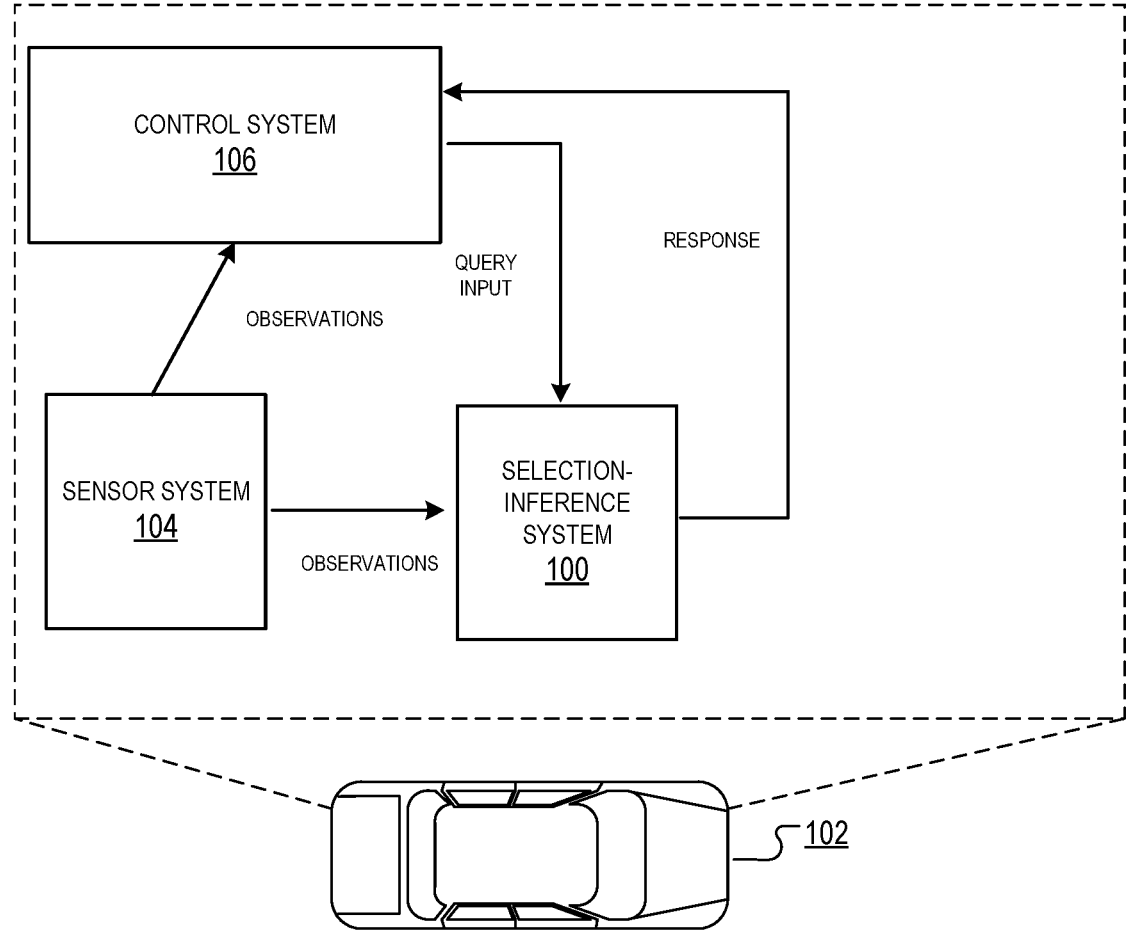
FIG. 1B shows the selection-inference system being used to control an agent interacting with an environment.

FIG. 1B shows an example of the operation of the selection-inference system 100 when the environment is a real-world environment being navigated by a mechanical agent 102.

In the example of FIG. 1B, the agent 102 is shown as a vehicle. However, more generally, the mechanical agent 102 can be any appropriate agent that is controlled by a control system as the agent navigates through the real-world environment.

The agent 102 includes one or more sensors 104 that capture observations of the environment, e.g., at specified time intervals, as the agent 102 navigates through the environment.

For example, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The agent 102 is also associated with a control system 106 that generates control signals for controlling the agent 102 using the observations generated by the sensors 104. In particular, the control system 106 generates control signals that cause the agent 102 to follow a planned trajectory through the environment by first determining an appropriate action for the agent 102 to perform, e.g., as part of performing a specified task, e.g., navigating to a particular location, identifying a particular object, moving a particular object to a given location, manipulating a particular object in some way, and so on, and then generating control signals that cause the agent 102 to perform the action.

The control system 106 can be deployed on-board the agent 102 or can be deployed remotely from the agent 102 and can transmit the control signals to the agent 102 over a data communication network.

The control signals can be control inputs to control the agent. For example, when the agent is a robot the control signals can be, e.g., torques for the joints of the robot or higher-level control commands. As another example, when the agent is an autonomous or semi-autonomous land, air, sea vehicle, the control signals can include actions to control navigation, e.g., steering, and movement of the vehicle, e.g., braking and/or acceleration of the vehicle. For example, the control signals can be, e.g., torques to the control surface or other control elements, e.g., steering control elements of the vehicle, or higher-level control commands.

In other words, the control signals can include for example, position, velocity, or force/torque/acceleration data for one or more joints of a robot or parts of another mechanical agent.

In these examples, like the control system 106, the system 100 can be deployed on-board the agent 102 or can be deployed remotely from the agent 102.

In these implementations, the system 100 is used to provide an additional layer of control on top of the control system 106 and the system 100 or another component can determine the query input 110 based on information received by the control system.

That is, the query input 110 may be determined by receiving a control signal from the agent control system 106, and then determining one or more natural language queries, e.g., relating to the agent 102 in the environment, from the control signal.

In some implementations, the agent control system 106 is an autonomous or semi-autonomous control system, e.g., that autonomously or semi-autonomously controls the navigation of the agent 102.

In some other implementations, the agent control system 106 has an interface to receive control commands, e.g., from a human operator.

In both these applications the described system 100 may be used to provide an additional layer of control, e.g., for safety purposes. For example the described system 100 may be used to inhibit control of the mechanical agent 102 in a way that could be dangerous or contrary to one or more rules.

One or more rules relating to control of the agent may be entered explicitly, e.g., as part of the context input, or may be implicit, e.g., included as natural language statements when training the neural networks used by the system 100, in particular when these each comprise a language model as described later. As one example, such rules may include rules relating to permitted movement of a vehicle, such as traffic rules. As another example such rules may include rules relating to decisions to be made to ensure safe behavior of the mechanical agent, e.g., to inhibit damage to the mechanical agent or to a human.

Thus, each query input 110 may relate to an action to be performed by the agent, e.g., an action that is under consideration by the control system 106.

For example, the query input 110 can define an action to be performed by the mechanical agent 102, e.g., in the form of a question such as "Do I turn left?" or "Is it safe for the agent to turn left?"

As another example, the query input 110 can ask what action is to be performed by the mechanical agent, e.g., "Which way should the agent turn?"

In the case of a robot, the query input 110 can relate to a sub-task of a series of sub-tasks that are to be performed to perform a task, e.g., "What do I do next?" or "Do I pick up object X?". The sub-tasks may themselves comprise a series of primitive actions for moving parts of the robot, e.g., to open grippers.

In general, the query input 110 includes one or more natural language queries. More particularly, the query input 110 can include a natural language description that defines information the response from the system is to provide. That is, the query input 110 explicitly or implicitly determines what is required from the response.

The response 150 to the query input 110 is used to control the mechanical agent 102 in the real world environment.

More specifically, the response 150 is used to control an action to be performed by mechanical agent 102.

As one example, the response 150 may inhibit an action that would otherwise be performed, i.e., the response may determine whether or not an action defined by the query input is performed.

As another example the response 150 may define an action to be performed, e.g., where the query input implicitly or explicitly requests an action to be determined.

In these implementations, obtaining the context input 120 can include obtaining one or more observations of the real world environment which, because the environment includes the agent, potentially includes one or more observations of the agent. The observations may be obtained from one or more sensors that may, but need not be the sensors 104 of the agent. As described above, the observations may include still or moving images, which, as used here, includes LIDAR point clouds, and/or other sensor data from one or more sensors sensing a state of the environment or agent.

The one or more observations are processed, e.g., by a first machine learning model, to generate a natural language representation of the one or more observations, i.e., to generate natural language text describing the observation, that is included in the context input 120.

There are many different types of machine learning model that may be used to achieve this. For example so called visual language models are typically configured to describe an image or video using natural language, e.g., to perform an image or video captioning task. More generally, such models can perform many different types of image processing task by formulating the task as a text generation problem, e.g., to detect or classify objects in an image or video. Correspondingly other machine learning models can be trained to generate natural language text describing the data from other types of sensor, e.g., to represent a physical position or force as a natural language statement that describes, e.g., the agent or environment or a part thereof. The natural language representation of the one or more observations is used to provide one or more of the natural language statements in the context input 120.

Additionally, the context input 120 can include one or more rules that relate to the current location of the agent 102 in the environment that are not directly generated from the observations generated by the sensors 104.

For example, the context input 120 can also have rules of common knowledge, populated from the weights of a trained machine learning model, a driving rules manual, hand-engineered or obtained from a knowledge graph or the Internet. Examples of such rules include "if a car's electrical systems get wet, they will short circuit", "if a car drives in the direction of something, it will end up there", "if the car's electrical systems are broken, the car is not safe to drive" and so on. Other examples of such rules include "the speed limit in the current location is 30 mph," "right turns are allowed after stop at this red light," "turning across double yellow lines is prohibited," and so on.

Thus, in these examples, the system 100 can be used to evaluate the consequences of potential actions that are being considered by the control system 106 before they are transmitted as control signals for the agent 102.

In some other implementations, the environment is a real-world environment that includes a manufacturing plant, e.g., a manufacturing plant for manufacturing a product, such as a chemical, biological, or mechanical product, or a food product. As used herein "manufacturing" a product also includes refining a starting material to create a product, or treating a starting material, e.g., to remove pollutants, to generate a cleaned or recycled product. The manufacturing plant may comprise a plurality of manufacturing units such as vessels for chemical or biological substances, or machines for processing solid or other materials. The manufacturing units are configured such that an intermediate version or component of the product is moveable between the manufacturing units during manufacture of the product, e.g., via pipes or mechanical conveyance. In implementations the system is used for controlling one or more of the manufacturing units or for controlling movement of the intermediate version or component of the product between the manufacturing units.

Thus, in these implementations, obtaining the context input 120 may then comprise obtaining, from one or more sensors, one or more observations of the manufacturing units or of the movement. The sensors may comprise any type of sensor monitoring the manufacturing units or the movement, e.g., sensors configured to sense mechanical movement or force, pressure, temperature; electrical conditions such as current, voltage, frequency, impedance; quantity, level, flow/movement rate or flow/movement path of one or more materials; physical or chemical conditions, e.g., a physical state, shape or configuration or a chemical state such as pH; configurations of the units such as the mechanical configuration of a unit, or valve configurations; image or video sensors to capture image or video observations of the manufacturing units or of the movement; or any other appropriate type of sensor. In implementations the one or more observations are processed to generate a natural language representation of the one or more observations, e.g., as previously described. The natural language representation of the one or more observations is used to provide one or more of the natural language statements of the context information.

The query input may relate to an action that controls operation of one or more of the manufacturing units or that controls the movement. The response to the query input is used to control operation of one or more of the manufacturing units or to control the movement. For example the response to the query input may be used to control, e.g., minimize, energy or other resource use, or to control the manufacture to obtain a desired quality or characteristic of the product. For example the actions may include actions that control items of equipment of the plant or actions that change settings that affect the manufacturing units or the movement of the product or intermediates or components thereof, e.g., to adjust or turn on/off items of equipment or manufacturing processes.

In some implementations the manufacturing plant has a plant control system to control the manufacturing units or to control the movement. The query input may be generated by receiving a control signal from the plant control system and generating one or more natural language queries for the query input from the control signal. In a similar way to that previously described the plant control system may be autonomous, semi-autonomous, or human-controlled.

In a similar way to that previously described the system may implement rules, e.g., to control or limit energy or other resource allocation, or to ensure a target quality or characteristic of the product, or to constrain operation of the plant, e.g., of the manufacturing units, within safe bounds.

In some implementations the environment is a real-world environment and the method is used for diagnosing a fault in a mechanical system operating in the real world environment. Then obtaining the context input may comprise obtaining from one or more sensors, e.g., as previously described, one or more observations of the mechanical system (which here includes observations of the operation of mechanical system). These are processed, e.g., as previously described, to generate a natural language representation of the one or more observations that is used to provide one or more of the natural language statements of the context information. In these implementations the query input relates to the operation of the mechanical system and the response to the query input is used to identify a fault in the mechanical system. For example the query input may comprise a general query such as "Is the system working correctly?" or "What is wrong with the system?" or a specific query such as "Is there a fault with component X?".

As another example, the environment can be an educational environment, e.g., the system can be deployed as part of an education software program that assists a user in learning or practicing one or more corresponding skills. In these examples, the context input 120 can include natural language statements describing or referencing a scenario or scene in a real-world or imagined environment, and the query input 110 can be a question about the scenario or scene that requires logical reasoning. As described below, the trace data generated by the system 100 as part of generating the response 150 can be used to provide insight to the user about the logical reasoning required to generate the response 150. That is, the trace data generated by the system 100 can be used to produce explanations of questions and their corresponding responses to assist a user in learning one or more skills.

As a particular example, the education software program can generate a question and accompanying context information (or receive this data from an external source). An example of such a question may be, e.g., "Why does an astronaut need an oxygen backpack?" The system 100 (given a context of elemental facts) could produce a reasoning trace like the following to assist a user in understanding the concept: "(1) Humans need oxygen to survive. There is no oxygen in space. Therefore, humans need a supply of oxygen to survive in space. (2) Oxygen can be supplied to astronauts through an oxygen backpack and humans need a supply of oxygen to survive in space. Therefore, humans can use an oxygen backpack to help astronauts survive in space."

As another example, the environment can be an information retrieval environment, e.g., the system can be deployed as part of a search engine or other software that allows a user to search for information in a corpus of documents, e.g., the Internet or another electronic document corpus. In these examples, the query input 110 can be any appropriate natural language query, and the context input 120 can include relevant statements from the corpus of documents, i.e., as identified by searching the corpus using conventional information retrieval techniques. The system 100 can then use the context input 120 to generate the response 150 to the query input 110 in a manner that allows a user to view a trace of the logical reasoning required to generate the response 150, i.e., to increase the confidence of the user in the veracity of the response 150 generated by the system 100.

Returning to the description of FIG. 1A, to generate the response 150, the system 100 uses a selection neural network 130 and an inference neural network 140.

More specifically, the system 100 generates the response by performing multiple update iterations.

At each update iteration, the system 100 performs a selection step by using the selection neural network 130 to select a proper subset of the natural language statements in the context input 120.

The system 100 then uses the selected proper subset and the inference neural network 140 to perform an inference step to generate a new natural language statement that represents a new fact, i.e., an "inferred" fact. The fact is referred to as "inferred" because the fact is not present in the context input 120 but is determined from the context input 120 by the system 100.

At each update iteration other than the last update iteration, the system 100 uses the new fact to update the context input 120, i.e., by adding the natural language statement representing the new fact to the context input 120.

At the last update iteration, the system 100 uses the new fact to generate the response 150. For example, the system 100 can provide, as the response 150, a natural language output that is derived from the new natural language statement generated at the last update iteration.

Thus, the system 100 iteratively adds new facts to the context input 120 and then uses the new fact generated at the last update iteration to generate the response 150 to the query input 110.

More specifically, the selection neural network 130 is a neural network that that is configured to process a selection input that includes the context input 120 (as of the current update iteration) and the query input 110 to generate a selection output that includes one or more of the natural language statements from the context input 120. Because the context input 120 is updated at each iteration, the selection output can identify different natural language statements at different update iterations.

The inference neural network 140 is a neural network that is configured to process an inference input that includes a selection output to generate an inference output that includes a natural language statement that represents a new fact for the update iteration. Because the selection outputs can be different for different update iterations, the inference outputs can also differ across update iterations.

In some implementations, the inference input does not include the context input 120 or the query input 110. That is, the inference neural network 140 only has access to the proper subset of the context input 120 that is included in the selection output and not the remaining natural language statements in the context input 120 or the query input 110.

Thus, at each update iteration, the system 100 processes a selection input that includes the context input 120 (as of the update iteration) and the query input 110 using the selection neural network 130 to generate a selection output for the update iteration that includes one or more of the natural language statements from the context input 120. These natural language statements can include statements that were included in the original context input obtained by the system 100, statements that were added to the context input at preceding update iterations, or both.

In some implementations, the selection neural network 130 is configured to generate, i.e., regress a text sequence that includes one or more of the natural language statements from the context input 120. In some of these implementations, the system 100 can employ constrained sampling to ensure that tokens that are generated by the neural network 130 are either (i) valid continuations of some natural language statement in the context input 120, (ii) the beginning of another natural language statement in the context input 130, or, optionally (iii) one or more predetermined tokens that denote, e.g., separators between natural language statements or the end of the regressed text sequence.

In some other implementations, the neural network 130 can be configured to generate a text sequence that includes placeholder references to natural language statements in the context input 120, e.g., generating a sentence, e.g., "sent 1". We know that "sent 4," where "sent 1" is a reference to the first sentence in the context input 120 and "sent 4" is a reference to the fourth sentence in the context input 120. The system can then substitute in the actual sentences to generate the selection output.

In yet other implementations, each selection step includes multiple internal steps. At each internal step, the selection neural network 130 is used to add a new statement to the selection output for the selection step. This is described in more detail below with reference to FIG. 3.

The system 100 then processes an inference input that includes the selection output for the update iteration using the inference neural network 140 to generate an inference output that includes a natural language statement that represents a new fact for the update iteration. As described above, if the update iteration is not the last update iteration, the system 100 then updates the context input 120 to include the natural language statement in the inference output for the update iteration.

Because of the manner in which the system 100 generates the response 150, the system 100 can also provide, as output, trace data 160 that provides an interpretable, natural language summary of the causal reasoning performed by the system 100 to generate the response 150. In particular, because the system 100 alternates between two steps: 1) selection, which involves choosing a subset of relevant information sufficient to make a single step of inference; and 2) inference, which only sees the limited information provided to it by the selection output and uses it to infer a new intermediate piece of evidence on the way to producing the final answer, the system ensures that intermediate inference outputs (and, optionally, selection outputs) provide an interpretable reasoning trace to justify the final answer. Moreover, the reasoning produced by the system 100 is causal, since each step follows from and depends on the previous step, and each inference is made in isolation based solely on the limited information provided by the selection output, without direct access to the query input or previous steps of reasoning.

In some implementations, the system 100 provides the trace data 160 along with the response 150, e.g., to a user. In some other implementations, the system 100 stores the trace data 160 in association with data identifying the response 150.

For example, the trace data 160 can later be accessed by a user that requests to see the "reasoning" performed by the system 100 that resulted in a particular control signal being transmitted to a mechanical agent.

As a simplified example, when the context input 120 indicates that a pedestrian is in the vicinity of the roadway on which an agent is traveling and the query input 110 is "what action to take," e.g., either "continue driving" or "stop driving," the trace data can include selection outputs like "There is a person crossing the road," and "we know that if someone is crossing the road it is not safe to drive'" and the inference could be "Therefore, it is not safe to drive".

As another simplified example, when the context input 120 indicates there is a lake in the vicinity of a vehicle and the query input 110 asks whether the vehicle should drive towards the lake, the trace data 160 can include intermediate inferences like: "therefore the car will end up in the lake-"→"lake means wet"→"wet means short circuiting-"→"short circuiting means not safe" and the response 150 could be "we should not drive forward."

The selection neural network 130 can generally have any appropriate architecture that allows the neural network to be used to map a selection input to a proper subset of the context input 120. Similarly, the inference neural network 140 can generally have any appropriate architecture that allows the neural network to be used to map an inference input to a new natural language statement.

As a particular example, both the selection neural network 130 and the inference neural network 140 can be respective language model neural networks. In general, a language model neural network is a neural network that has been trained so that, given a text prompt that includes a sequence of tokens in a natural language, the neural network can generate the next token in the sequence. This process can be repeated to extend the text prompt one token at a time to generate a natural language output, i.e., to generate the natural language output auto-regressively token by token. At each time "time step," the language model neural network processes the current sequence to generate a probability distribution over a vocabulary of tokens. The next token can then be selected using the probability distribution, e.g., by sampling from the distribution using nucleus sampling or another sampling technique or by selecting the highest-probability token. The tokens in the vocabulary can include any of a variety of tokens, e.g., some combination of words, sub-words, characters, punctuation and other symbols, and numbers. In general, the language model neural network is trained on a corpus of text made up of tokens from the vocabulary (and optionally other tokens that can be mapped to a designated out-of-vocabulary token), to predict the next token in a sequence of tokens from the training data.

It is surprising, but well-established, that large language model neural networks can perform tasks that they were not explicitly trained to perform. For example they can perform translation tasks (provided that the training corpus included words in different languages), arithmetic, and many other tasks. A language model neural network can be made to perform a particular task by providing a natural language description of the desired response as an input or "prompt". The prompt may be a few-shot prompt where a few, e.g., 1 to 10, examples of a query and an example output are provided in the text prior to the actual query. Instead or in addition, a language model neural network may be "fine-tuned" to perform a particular task, by obtaining a pre-trained language model neural network trained on a large corpus of examples as previously described and then further training part of all of the language model neural network on a relatively small number of examples particular to the type of task that is to be performed.

Thus, a trained language model neural network can perform control and diagnosis tasks of the type described. Where the system is to comply with rules in generating the response these may be included in the context information, e.g., in the prompt, and or as statements in the corpus of training data or in data used to fine tune the language model neural network.

In other words, in some implementations, the selection neural network 130 and the inference neural network 140 are the same, pre-trained language model neural network. In these implementations, each selection input includes one type of few shot prompt that causes the language model to generate a selection output and each inference input includes a different type of few shot prompt that causes the language model to generate an inference output.

For example, the few-shot prompt for the inference neural network 140 can include one or more example inference input—inference output pairs arranged according to a predetermined syntax (followed by the subset of the context input identified by the corresponding selection output) while the few-shot prompt for the selection neural network 130 can include one or more example selection input—selection output pairs arranged according to a predetermined syntax (followed by the context input and the query input arranged according to a predetermined syntax).

For example, the few shot prompt in each selection input can be of the form:

```
# n-shot prompt
# First example.
<context 1>
<query 1>
# Example selection
<fact>. We know that <fact>[ and <fact>]*. Therefore,
...
# Problem to solve.
<context>
<query>
```

In this example, statements that follow a # are not included in the prompt (or are optional) and are only included in the example for explanation, <context> represents the natural language text in a context input, <query> represents a query input, the " . . . " indicates that the First example is followed by one or more additional examples in the same format, each <fact> is a natural language statement copied from the corresponding context and [and <fact>]* means that the system can select more than one fact for each step of inference, where the total number of facts in a given inference step is a hyper-parameter.

As another example, the few shot prompt in each inference input can be of the form:

```
#n-shot inference prompt
# First example.
<fact>. We know that <fact>[ and <fact>]*. Therefore, <new fact>.
...
# Problem to solve.
<output of the Selection step>. Therefore,
```

In this example, the <new fact> in each example in the prompt is an inferred fact that is generated ("inferred") from the <fact>s in the example, and the <output of the Selection step> are the one or more facts in the selection output for the selection step formatted in the same way as the examples in the few shot prompt.

The language model neural network may be a large language model neural network, e.g., one that has greater than 1 billion, 10 billion or 100 billion trained parameters. The language model neural network may have been trained on greater than 10 billion, 100 billion or 1000 billion words or tokens representing words or other text tokens, e.g., sub-words (also known as "word pieces").

In some other implementations, the selection neural network 130 and the inference neural network 140 are both language model neural networks that have the same architecture and that were pre-trained on the same large corpus, but the selection neural network 130 was fine-tuned on a first data set of example selection input-selection output pairs, the inference neural network 140 was fine-tuned on a second data set of example inference input-selection input pairs, or both. For example, fine-tuning the selection neural network 130 can allow the selection neural network 130 to more effectively generate outputs that include placeholder references to facts from the context input as described above. In some of these implementations, each selection input and each inference output each include a respective few-shot prompt while, in others of these implementations, no few-shot prompt is included.

In some implementations, the language model neural network is an autoregressive transformer neural network, where a transformer neural network is characterized by having a succession of self-attention neural network layers. A self-attention neural network layer has an attention layer input for each element of the input and is configured to apply an attention mechanism over the attention layer input to generate an attention layer output for each element of the input; there are many different attention mechanisms that may be used. In some implementations the language model neural network can be a mixture-of-experts model.

Figure 1C:
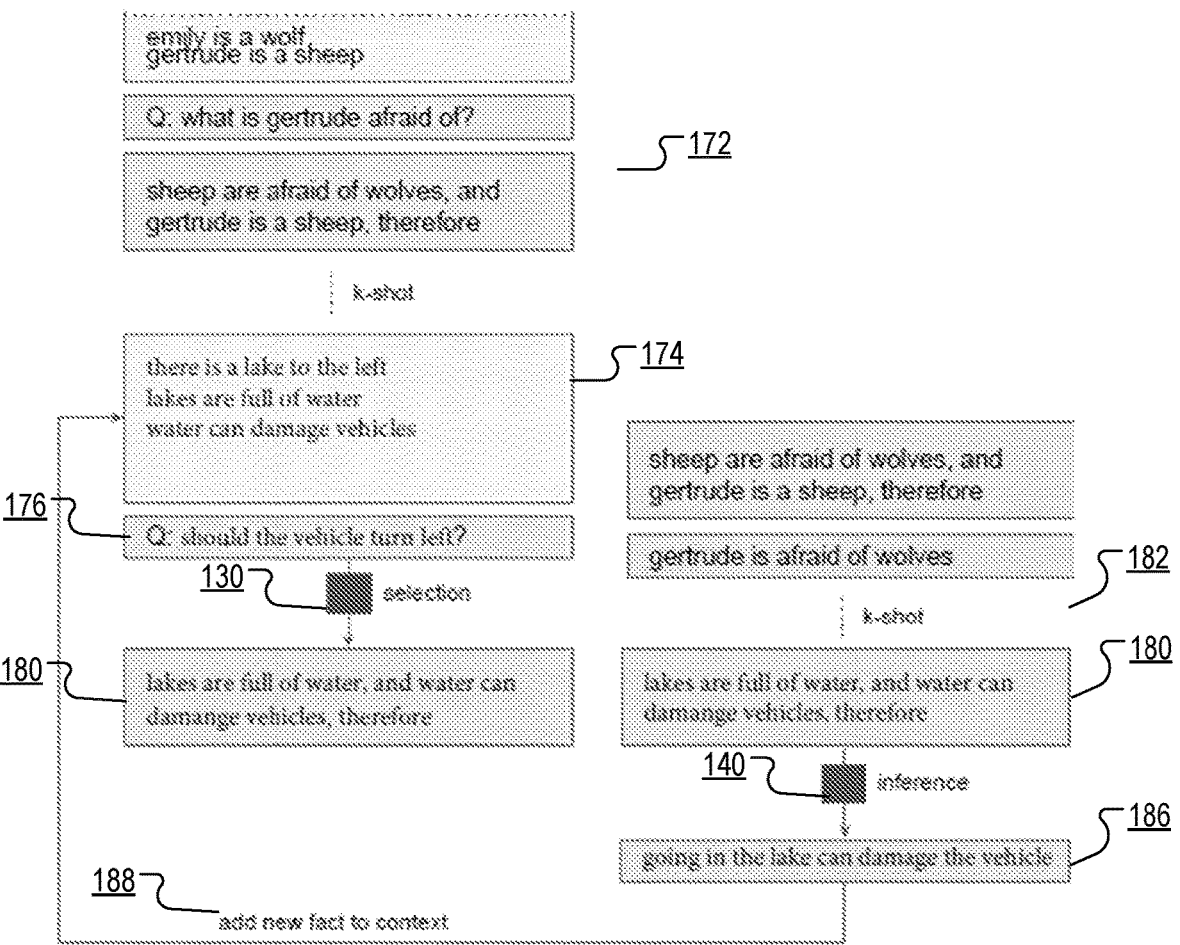
FIG. 1C shows a simplified example of a selection step and an inference step.

FIG. 1C shows a simplified example of a selection step and an inference step being performed when the system 100 is used to control a vehicle, e.g., an autonomous or semi-autonomous vehicle.

In the example of FIG. 1C, the query input 176 is "should the vehicle turn left?" and the context input 174 (as of the example selection step shown in FIG. 1C) is "there is a lake to the left, lakes are full of water, water can damage vehicles." To perform the selection step, the system 100 generates a selection input that includes a k-shot prompt 172 (a portion of the example context for one of the examples in the k-shot prompt 172, an example query input for the example, and an example selection output for the example are shown in FIG. 1C), the context input 174, and the query input 176. The system 100 uses the selection neural network 130 to process the selection input to generate a selection output 180 that states "lakes are full of water, and water can damage vehicles, therefore."

The system 100 then generates an inference input that includes a k-shot prompt 182 (one of the examples in the k-shot prompt 182 is shown in FIG. 1C) and the selection output 180. The system 100 uses the inference neural network 140 to process the inference input to generate an inference output 182 that is a new inferred fact, i.e., that states "going in the lake can damage the vehicle." The system 100 then adds 188 the new inferred fact to the context input 174 for use in the next selection step.

Figure 2:
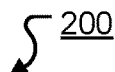
FIG. 2 is a flow diagram of an example process for generating a response to a query.
Figure 2:
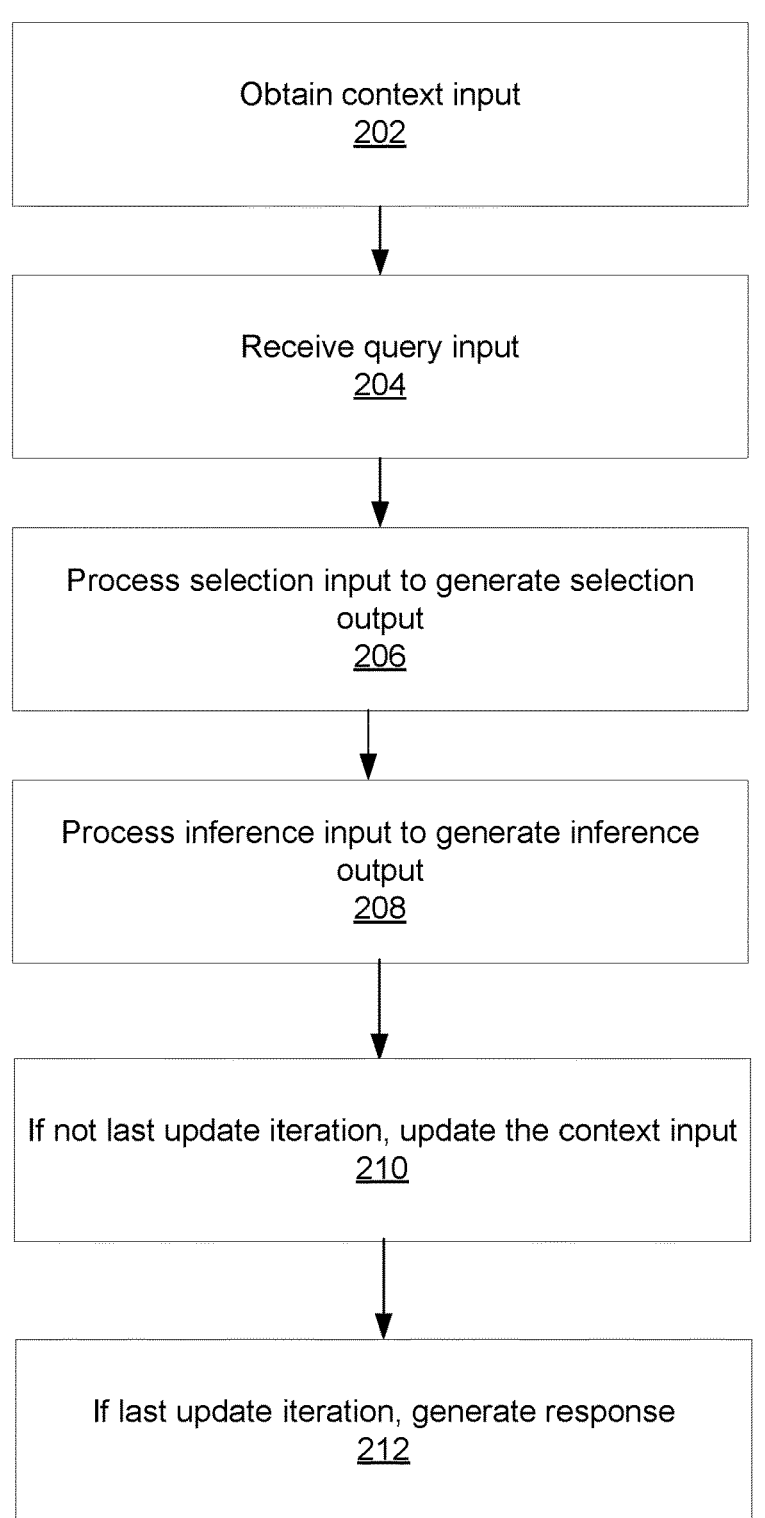

FIG. 2 is a flow diagram of an example process 20 for generating a response to a query input. For convenience, the process 200 will be described as being performed by a system of one or more computers located in one or more locations. For example, a selection-inference system, e.g., the selection-inference system 100 of FIG. 1A, appropriately programmed in accordance with this specification, can perform the process 200.

The system obtains a context input that includes context information (step 202). The context information includes one or more natural language statements that each represent a fact or a rule relating to an environment.

The system receives a query input that includes one or more queries relating to the environment (step 204).

The system then generates a response, e.g., a natural language output, to the query input by performing update iterations until a termination criterion is satisfied. For example, the termination criterion can be satisfied after a threshold number of iterations have been performed. As another example, the termination criterion can be satisfied if the same selection output is generated at a threshold number of consecutive update iterations. As another example, the termination criterion can be satisfied if the same inference output is generated at a threshold number of consecutive update iterations. As yet another example, the system can include a halting neural network that has been trained to receive a halting input that includes the query input, the most recent inference output and, optionally, one or more of (i) previously generated selection outputs, inference outputs, or both, or (ii) the context input and to process the halting input to generate an indication of whether the most recent inference output is a valid response to the query input. As another example, the system can apply one or more rules, e.g., based on string matching between the inference output and the query input, to determine whether the most recent inference output is a valid response to the query input.

At each update iteration, the system processes a selection input that includes the context input and the query input using a selection neural network to generate a selection output for the update iteration that includes one or more of the natural language statements from the context input (step 206). That is, the selection output generally includes a proper subset of the natural language statements in the context input.

The system then processes an inference input that includes the selection output for the update iteration using an inference neural network to generate an inference output that includes a natural language statement that represents a new fact for the update iteration (step 208).

At each update iteration other than the last update iteration, i.e., if the system determines that the termination criterion is not satisfied after performing the update iteration, the system updates the context input to include the natural language statement in the inference output for the update iteration (step 210).

At the last update iteration, i.e., if the system determines that the termination criterion is satisfied after performing the update iteration, the system generates the response using the natural language statement in the inference output for the last update iteration (step 212). The system can also generate (and provide as part of the response or store for future use) a reasoning trace that includes the natural language statement in the inference output at each update iteration other than the last update iteration and, optionally, the selection outputs for the update iterations.

Figure 3:
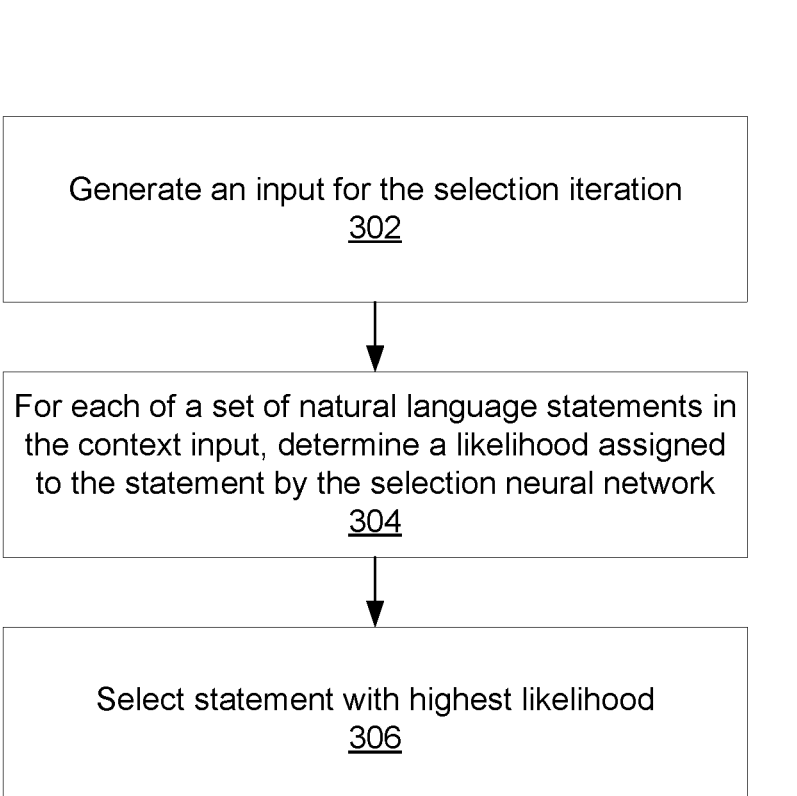
FIG. 3 is a flow diagram of an example process for generating a selection output.

FIG. 3 is a flow diagram that shows an example process 300 for generating a selection output at a given update iteration. For convenience, the process 300 will be described as being performed by a system of one or more computers located in one or more locations. For example, a selection-inference system, e.g., the selection-inference system 100 of FIG. 1A, appropriately programmed in accordance with this specification, can perform the process 300.

In the example of FIG. 3, the system generates the selection output by selecting a respective natural language statement from the context input at each of a sequence of one or more selection iterations. For example, the system can perform a predetermined number of selection iterations to add a predetermined number of natural language statements to the selection output. As another example, the system can perform selection iterations until some other criterion is satisfied.

At each selection iteration, the system generates an input for the selection iteration that includes the context input, the query input, and any natural language statements selected at any previous selection iterations that precede the selection iteration in the sequence (step 302). For example, when the selection inputs to the selection neural network include a few-shot prompt as described above, the system can modify the few-shot prompt (that already includes the context input and the query input) to include, at corresponding places in the pre-determined syntax, the natural language statements selected at any previous selection iterations that precede the selection iteration in the sequence.

For each of a set of natural language statements in the context information, the system then processes the input for the selection iteration using the selection neural network to determine a likelihood assigned to the natural language statement by the selection neural network (step 304).

For example, the system can select, as the set of natural language statements, the natural language statements in the context input that have not already been selected at previous selection iterations.

As described above, the selection neural network can be a language model neural network that predicts a probability distribution over text tokens given the current text tokens in the sequence. In this case, the system can determine the likelihood assigned to the natural language statement by combining, e.g., multiplying, the probability assigned to each text token in the natural language statement by the selection neural network. The probability assigned to a given token is the probability for the given token in the probability distribution generated by processing any tokens that precede the given token in the natural language statement using the selection neural network conditioned on the input for the selection neural network, e.g., by processing a combined sequence that includes the input for the selection iteration and any tokens that precede the given token in the natural language statement using the selection neural network.

The system then selects, from the set of natural language statements, the natural language statement with the highest likelihood (step 306).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining a context input comprising context information, the context information comprising one or more natural language statements that each represent a fact or a rule relating to an environment, wherein the environment is a real world environment and the method is used for controlling an agent acting in the real world environment to perform a task;

receiving a query input comprising a query relating to the environment, wherein the query input relates to an action to be performed by the agent;

generating a response to the query input by performing update iterations until a termination criterion is satisfied, the generating comprising, at each update iteration:

processing a selection input comprising the context input and the query input using a selection neural network to generate a selection output for the update iteration that comprises one or more of the natural language statements from the context input; and processing an inference input comprising the selection output for the update iteration using an inference neural network to generate an inference output that comprises a natural language statement that represents a new fact for the update iteration; and at each update iteration other than a last update iteration:

updating the context input to include the natural language statement in the inference output for the update iteration; and evaluating whether the response to the query input indicates that a proposed action violates a rule relating to control of the agent; and using the response to the query input to control the agent in the real world environment.

2. The method of claim 1, further comprising:

providing, as the response, (i) a natural language output derived from the natural language statement in the inference output for the last update iteration and (ii) a reasoning trace that comprises the natural language statement in the inference output at each update iteration other than the last update iteration.

3. The method of claim 2, wherein the reasoning trace further comprises the selection outputs for the update iterations.

4. The method of claim 1, wherein the inference input does not include the context input or the query input.

5. The method of claim 1 wherein the agent is a mechanical agent acting in the real world environment to perform the task.

6. The method of claim 5, wherein obtaining the context input comprises obtaining, from one or more sensors, one or more observations of the real world environment, and processing the one or more observations to generate a natural language representation of the one or more observations.

7. The method of claim 6, further comprising:

using the natural language representation of the one or more observations to provide one or more of the natural language statements of the context information.

8. The method of claim 6 wherein the mechanical agent has an agent control system to control actions of the mechanical agent, wherein the query input comprises one or more natural language queries, and wherein receiving the query input comprises:

receiving a control signal from the agent control system; and generating the one or more natural language queries from the control signal.

9. The method of claim 6 wherein the mechanical agent comprises an autonomous or semi-autonomous vehicle navigating in the real-world environment, and wherein the action comprises an action to control movement of the vehicle in the real-world environment.

10. The method of claim 1, wherein:

the context input is derived from at least an observation characterizing a current state of the real-world environment that is generated from measurements from one or more sensors configured to sense the real-world environment, the query input comprises data characterizing planned navigation of an agent, and the response to the query input characterizes an action to be performed by the agent in response to the observation.

11. The method of claim 10, wherein the agent is a robot or an autonomous vehicle.

12. The method of claim 10, further comprising:
controlling navigation of the agent based on the response to the query input.

13. The method of claim 1 wherein the environment is a manufacturing plant for manufacturing a product, the manufacturing plant comprising a plurality of manufacturing units configured such that an intermediate version or component of the product is moveable between the manufacturing units during manufacture of the product, wherein the method is used for controlling one or more of the manufacturing units or for controlling movement of the intermediate version or component of the product between the manufacturing units, and wherein the agent is a plant control system of the manufacturing plant to control the manufacturing units or to control the movement; wherein obtaining the context input comprises obtaining, from one or more sensors, one or more observations of the manufacturing units or of the movement, and processing the one or more observations to generate a natural language representation of the one or more observations; and wherein the query input relates to an action that controls operation of one or more of the manufacturing units or that controls the movement;

the method further comprising:

using the natural language representation of the one or more observations to provide one or more of the natural language statements of the context information; and using the response to the query input to control operation of one or more of the manufacturing units or to control the movement.

14. The method of claim 13 wherein the query input comprises one or more natural language queries, and wherein receiving the query input comprises:

receiving a control signal from the plant control system; and generating the one or more natural language queries from the control signal.

15. The method of claim 1 wherein the query input comprises a natural language description that defines information the response is to provide.

16. The method of claim 1, further comprising:
generating at least one of the natural language statements in the context input by processing an observation using a first machine learning model configured to process the observation to generate natural language text describing the observation.

17. The method of claim 16, further comprising:
generating at least one of the natural language statements in the context input by processing the observation using a second machine learning model configured to process (i) the observation, (ii) the natural language text describing the observation, or (iii) both to generate natural language text characterizing one or more rules for determining the new fact that are relevant to the observation.

18. The method of claim 1, wherein the termination criterion is satisfied when a threshold number of update iterations have been performed.

19. The method of claim 1, wherein processing a selection input comprising the context input and the query input using a selection neural network to generate a selection output for the update iteration that comprises one or more of the natural language statements in the context information comprises:

selecting a respective natural language statement from the context information at each of a sequence of one or more selection iterations, the selecting comprising, at each selection iteration:

generating an input for the selection iteration, the input comprising the context input, the query input, and any natural language statements selected at any previous selection iterations that precede the selection iteration in the sequence; and selecting the respective natural language statement by processing the input for the selection iteration using the selection neural network.

20. The method of claim 19, wherein selecting the respective natural language statement of the context information for the selection iteration comprises:

for each of a set of natural language statements in the context information:

processing the input for the selection iteration using the selection neural network to determine a likelihood assigned to the natural language statement by the selection neural network; and selecting, from the set of natural language statements, the natural language statement with a highest likelihood.

21. The method of claim 1, wherein:
the selection neural network and the inference neural network are the same neural network,
the selection input comprises a first few-shot prompt, and
the inference input comprises a second, different few-shot prompt.

22. The method of claim 21, wherein:
generating an input for the selection iteration comprises modifying the first few-shot prompt to include the natural language statements selected at any previous selection iterations that precede the selection iteration in a sequence of one or more selection iterations.

23. The method of claim 1, wherein the selection neural network and the inference neural network are the same pre-trained language model neural network.

24. One or more non-transitory computer-readable storage media storing instructions that when executed by one or more computers cause the one or more computers to perform operations comprising:

obtaining a context input comprising context information, the context information comprising one or more natural language statements that each represent a fact or a rule relating to an environment, wherein the environment is a real world environment and the method is used for controlling an agent acting in the real world environment to perform a task;

receiving a query input comprising a query relating to the environment, wherein the query input relates to an action to be performed by the agent;

generating a response to the query input by performing update iterations until a termination criterion is satisfied, the generating comprising, at each update iteration:

processing a selection input comprising the context input and the query input using a selection neural network to generate a selection output for the update iteration that comprises one or more of the natural language statements from the context input; and processing an inference input comprising the selection output for the update iteration using an inference neural network to generate an inference output that comprises a natural language statement that represents a new fact for the update iteration; and at each update iteration other than a last update iteration:

updating the context input to include the natural language statement in the inference output for the update iteration; and evaluating whether the response to the query input indicates that a proposed action violates a rule relating to control of the agent; and using the response to the query input to control the agent in the real world environment.

25. A system comprising one or more computers and one or more storage devices storing instructions that when executed by the one or more computers cause the one or more computers to perform operations comprising:

obtaining a context input comprising context information, the context information comprising one or more natural language statements that each represent a fact or a rule relating to an environment, wherein the environment is a real world environment and the method is used for controlling an agent acting in the real world environment to perform a task;

receiving a query input comprising a query relating to the environment, wherein the query input relates to an action to be performed by the agent;

generating a response to the query input by performing update iterations until a termination criterion is satisfied, the generating comprising, at each update iteration:

processing a selection input comprising the context input and the query input using a selection neural network to generate a selection output for the update iteration that comprises one or more of the natural language statements from the context input; and processing an inference input comprising the selection output for the update iteration using an inference neural network to generate an inference output that comprises a natural language statement that represents a new fact for the update iteration; and at each update iteration other than a last update iteration:

updating the context input to include the natural language statement in the inference output for the update iteration; and evaluating whether the response to the query input indicates that a proposed action violates a rule relating to control of the agent; and using the response to the query input to control the agent in the real world environment.

26. The system of claim 25, the operations further comprising:

providing, as the response, (i) a natural language output derived from the natural language statement in the inference output for the last update iteration and (ii) a reasoning trace that comprises the natural language statement in the inference output at each update iteration other than the last update iteration.

* * * * *